United States Patent [19]
Ackley

[11] Patent Number: 6,024,289
[45] Date of Patent: Feb. 15, 2000

[54] METHOD AND APPARATUS FOR ENCODING AND DECODING SINGLE BYTE CHARACTERS IN DOUBLE BYTE CHARACTER SET OF MACHINE-READABLE SYMBOLOGIES, SUCH AS BAR CODE SYMBOLOGIES

[75] Inventor: H. Sprague Ackley, Everett, Wash.

[73] Assignee: Intermec IP Corporation, Beverly Hills, Calif.

[21] Appl. No.: 08/999,613

[22] Filed: Jan. 22, 1998

[51] Int. Cl.$^7$ ............................................ G06K 7/10
[52] U.S. Cl. ................................ 235/494; 235/462.01
[58] Field of Search ........... 235/462.01, 462.02–462.15, 235/462.25, 462.24, 472.01, 494, 454

[56] References Cited

U.S. PATENT DOCUMENTS

| | | | |
|---|---|---|---|
| 4,079,482 | 3/1978 | Yeh | 197/1 A |
| 4,307,293 | 12/1981 | Lazzarotti et al. | 235/462 |
| 5,097,263 | 3/1992 | Delpech et al. | 341/155 |
| 5,128,526 | 7/1992 | Yoshida | 235/456 |
| 5,204,515 | 4/1993 | Yoshida | 235/456 |
| 5,276,315 | 1/1994 | Surka | 235/462 |
| 5,298,731 | 3/1994 | Ett | 235/494 |
| 5,376,780 | 12/1994 | Klueter | 235/462 |
| 5,380,998 | 1/1995 | Bossen et al. | 235/494 |
| 5,389,770 | 2/1995 | Ackley | 235/462 |
| 5,420,403 | 5/1995 | Allum et al | 235/375 |
| 5,504,318 | 4/1996 | Joseph et al. | 235/462 |
| 5,619,027 | 4/1997 | Ackley | 235/462 |

FOREIGN PATENT DOCUMENTS

| | | |
|---|---|---|
| 0 667 592 A1 | 8/1995 | European Pat. Off. . |
| 33 30 261 | 3/1985 | Germany . |
| WO 95/12863 | 5/1995 | WIPO . |
| WO 96/13803 | 5/1996 | WIPO . |
| WO 98/47101 | 10/1998 | WIPO . |

OTHER PUBLICATIONS

Walker, Nathan, "ASCII–based compaction eases bar–code decoder's work ",*Electronic Design* 30:22, Oct. 1982, pp. 163–166.

"Information processing—8–bit single–byte coded graphic character sets—, Part 1: Latin alphabet No. 1," *ISO 8859–L*:1987 (E), pp. 1–7.

"Information processing—8–bit sinagle–byte coded graphic character sets, Part 5: Latin alphabet No. 4," *ISO 8859–4*:1988 (E), pp. 1–5.

(List continued on next page.)

*Primary Examiner*—Thien M. Le
*Attorney, Agent, or Firm*—Perkins Coie LLP

[57] ABSTRACT

A method and apparatus efficiently encodes a stream of character codes corresponding to the data characters from a first set of data characters, a number of the data characters also being contained in a second set of data characters which is a subset of the first set of data characters. The method and apparatus according to one exemplary embodiment parses the data stream to remove therefrom all character codes corresponding to data character contained in the second set of data characters. Each of the character codes in the parsed data stream is converted according to a first translation into a first defined number of symbol values and each of the character codes parsed from the data stream is converted according to a second translation into a second number of symbol values. Each of the symbol values corresponds to a symbol element. A method and apparatus also decodes a stream of symbol values, corresponding to a set of efficiently encoded symbol characters, to produce a string of character codes. The decoding method and apparatus receives the data stream, parses the data stream to separate symbol values corresponding to data characters encoded in a single symbol character from symbol values corresponding to data characters encoded in more than one symbol character. Each of the symbol values parsed from the data stream is decoded according to a first translation into a character code. Each set of the symbol values remaining in the parsed data stream corresponding to a single data character is decoded according to a second translation into a corresponding character code.

47 Claims, 8 Drawing Sheets

OTHER PUBLICATIONS

"Bar Code Compression Decompression," *IBM Technical Disclosure Bulletin* 32:12, May 1990, pp. 288–290.

"Bar Code Print Quality—Guideline," *ANSI X3.182*—1990, pp. 1–29.

The Unicode Standard Worldwide Character Encoding, Version 1, vol. 1, *The Unicode Consortium*, Addison–Wesley Publishing Company, Inc., 1991, pp. 1–6 and 340.

Palmer, Roger C., "Symbologies," *The Bar Code Book, 2d ed., Chapter 4*, Halmers Publishing, Inc., 1991, pp. 15–59.

"Alphanumeric Data Compaction, Rev. C," Intermec Corporation, 1992, 6 pages.

"Uniform Symbology Specification Code 93," *AIM USA*, Apr. 1993, pp. 1–10.

"Codablock F (128) Bar Coding—Symbology Specification—Codablock," , *ICS International AG*, 1993, pp. 1–44.

Schuessler, Rick, "Using Extended Channel Interpretation (ECI's) for International Character Set Standardization," *Scan–Tech Proceedings*, Nov. 1996, pp. 294–305.

"Extended Channel Interpretation (ECI) Assignments, Release 2," ECI Assignments, Aug. 1995, pp. 1–13.

| value | character | data | value | character | data |
|---|---|---|---|---|---|
| 00 | 1 3 1 1 1 2 | 0 | 47 | 1 1 1 1 3 2 | Extended Channel Interpretation, ECI |
| 01 | 1 1 1 2 1 3 | 1 | 48 | 1 1 1 2 3 1 | Numeric Mode (3.3-bit) |
| 02 | 1 1 1 3 1 2 | 2 | 49 | 1 1 3 1 1 2 | Byte Mode (8-bit) |
| 03 | 1 1 1 4 1 1 | 3 | 50 | 1 1 3 2 1 1 | Word Mode (16-bit) |
| 04 | 1 2 1 1 1 3 | 4 | 51 | 1 1 4 1 1 1 | Function 1, FNC 1 |
| 05 | 1 2 1 2 1 2 | 5 | 52 | 4 1 1 1 1 1 | Special Features Flag |
| 06 | 1 2 1 3 1 1 | 6 | | | |
| 07 | 1 1 1 1 1 4 | 7 | | 2 1 3 1 1 1 | Start 93i |
| 08 | 1 3 1 2 1 1 | 8 | | 1 1 1 1 4 1 | Start Code 93 |
| 09 | 1 4 1 1 1 1 | 9 | | 1 1 1 1 4 1 1 | Stop |
| 10 | 2 1 1 1 1 3 | A | | | |
| 11 | 2 1 1 2 1 2 | B | | | |
| 12 | 2 1 1 3 1 1 | C | | | |
| 13 | 2 2 1 1 1 2 | D | | | |
| 14 | 2 2 1 2 1 1 | E | | | |
| 15 | 2 3 1 1 1 1 | F | | | |
| 16 | 1 1 2 1 1 3 | G | | | |
| 17 | 1 1 2 2 1 2 | H | | | |
| 18 | 1 1 2 3 1 1 | I | | | |
| 19 | 1 2 2 1 1 2 | J | | | |
| 20 | 1 3 2 1 1 1 | K | | | |
| 21 | 1 1 1 1 2 3 | L | | | |
| 22 | 1 1 1 2 2 2 | M | | | |
| 23 | 1 1 1 3 2 1 | N | | | |
| 24 | 1 2 1 1 2 2 | O | | | |
| 25 | 1 3 1 1 2 1 | P | | | |
| 26 | 2 1 2 1 1 2 | Q | | | |
| 27 | 2 1 2 2 1 1 | R | | | |
| 28 | 2 1 1 1 2 2 | S | | | |
| 29 | 2 1 1 2 2 1 | T | | | |
| 30 | 2 2 1 1 2 1 | U | | | |
| 31 | 2 2 2 1 1 1 | V | | | |
| 32 | 1 1 2 1 2 2 | W | | | |
| 33 | 1 1 2 2 2 1 | X | | | |
| 34 | 1 2 2 1 2 1 | Y | | | |
| 35 | 1 2 3 1 1 1 | Z | | | |
| 36 | 1 2 1 1 3 1 | dash, – | | | |
| 37 | 3 1 1 1 1 2 | period, . | | | |
| 38 | 3 1 1 2 1 1 | SPACE, sp | | | |
| 39 | 3 2 1 1 1 1 | $ | | | |
| 40 | 1 1 2 1 3 1 | / | | | |
| 41 | 1 1 3 1 2 1 | + | | | |
| 42 | 2 1 1 1 3 1 | % | | | |
| 43 | 1 2 1 2 2 1 | Shift 1, S1 | | | |
| 44 | 3 1 2 1 1 1 | Shift 2, S2 | | | |
| 45 | 3 1 1 1 2 1 | Shift 3, S3 | | | |
| 46 | 1 2 2 2 1 1 | Shift 4, S4 | | | |

Full-ASCII encodation using shift characters

| ASCII VALUE | ASCII CHAR. | 93i | | ASCII VALUE | ASCII CHAR. | 93i | | ASCII VALUE | ASCII CHAR. | 93i | |
|---|---|---|---|---|---|---|---|---|---|---|---|
| 0 | NUL | [S2] | U | 44 | , | [S3] | L | 88 | X | X | |
| 1 | SCH | [S1] | A | 45 | - | - | | 89 | Y | Y | |
| 2 | STX | [S1] | B | 46 | . | . | | 90 | Z | Z | |
| 3 | ETX | [S1] | C | 47 | / | / | | 91 | [ | [S2] | K |
| 4 | EOT | [S1] | D | 48 | 0 | 0 | | 92 | \ | [S2] | L |
| 5 | ENQ | [S1] | E | 49 | 1 | 1 | | 93 | ] | [S2] | M |
| 6 | ACK | [S1] | F | 50 | 2 | 2 | | 94 | ^ | [S2] | N |
| 7 | BEL | [S1] | G | 51 | 3 | 3 | | 95 | _ | [S2] | O |
| 8 | BS | [S1] | H | 52 | 4 | 4 | | 96 | ` | [S2] | W |
| 9 | HT | [S1] | I | 53 | 5 | 5 | | 97 | a | [S4] | A |
| 10 | LF | [S1] | J | 54 | 6 | 6 | | 98 | b | [S4] | B |
| 11 | VT | [S1] | K | 55 | 7 | 7 | | 99 | c | [S4] | C |
| 12 | FF | [S1] | L | 56 | 8 | 8 | | 100 | d | [S4] | D |
| 13 | CR | [S1] | M | 57 | 9 | 9 | | 101 | e | [S4] | E |
| 14 | SO | [S1] | N | 58 | : | [S3] | Z | 102 | f | [S4] | F |
| 15 | SI | [S1] | O | 59 | ; | [S2] | F | 103 | g | [S4] | G |
| 16 | DLE | [S1] | P | 60 | < | [S2] | G | 104 | h | [S4] | H |
| 17 | DC1 | [S1] | Q | 61 | = | [S2] | H | 105 | i | [S4] | I |
| 18 | DC2 | [S1] | R | 62 | > | [S2] | I | 106 | j | [S4] | J |
| 19 | DC3 | [S1] | S | 63 | ? | [S2] | J | 107 | k | [S4] | K |
| 20 | DC4 | [S1] | T | 64 | @ | [S2] | V | 108 | l | [S4] | L |
| 21 | NAK | [S1] | U | 65 | A | A | | 109 | m | [S4] | M |
| 22 | SYN | [S1] | V | 66 | B | B | | 110 | n | [S4] | N |
| 23 | ETB | [S1] | W | 67 | C | C | | 111 | o | [S4] | O |
| 24 | CAN | [S1] | X | 68 | D | D | | 112 | p | [S4] | P |
| 25 | EM | [S1] | Y | 69 | E | E | | 113 | q | [S4] | Q |
| 26 | SUB | [S1] | Z | 70 | F | F | | 114 | r | [S4] | R |
| 27 | ESC | [S2] | A | 71 | G | G | | 115 | s | [S4] | S |
| 28 | FS | [S2] | B | 72 | H | H | | 116 | t | [S4] | T |
| 29 | GS | [S2] | C | 73 | I | I | | 117 | u | [S4] | U |
| 30 | RS | [S2] | D | 74 | J | J | | 118 | v | [S4] | V |
| 31 | US | [S2] | E | 75 | K | K | | 119 | w | [S4] | W |
| 32 | SP | SPACE | | 76 | L | L | | 120 | x | [S4] | X |
| 33 | ! | [S3] | A | 77 | M | M | | 121 | y | [S4] | Y |
| 34 | " | [S3] | B | 78 | N | N | | 122 | z | [S4] | Z |
| 35 | # | [S3] | C | 79 | O | O | | 123 | { | [S2] | P |
| 36 | $ | $ | | 80 | P | P | | 124 | | | [S2] | Q |
| 37 | % | % | | 81 | Q | Q | | 125 | } | [S2] | R |
| 38 | & | [S3] | F | 82 | R | R | | 126 | ~ | [S2] | S |
| 39 | ' | [S3] | G | 83 | S | S | | 127 | DEL | [S2] | T |
| 40 | ( | [S3] | H | 84 | T | T | | | | | |
| 41 | ) | [S3] | I | 85 | U | U | | | | | |
| 42 | * | [S3] | J | 86 | V | V | | | | | |
| 43 | + | + | | 87 | W | W | | | | | |

Note: Shift 1 denoted by [S1], Shift 2 denoted by [S2], Shift 3 denoted by [S3], Shift 4 denoted by [S4].

METHOD AND APPARATUS FOR ENCODING AND DECODING SINGLE BYTE CHARACTERS IN DOUBLE BYTE CHARACTER SET OF MACHINE-READABLE SYMBOLOGIES, SUCH AS BAR CODE SYMBOLOGIES

TECHNICAL FIELD

This invention relates to machine-readable symbologies and human readable data characters, and methods for efficiently encoding and decoding machine-readable symbols.

BACKGROUND OF THE INVENTION

Bar code symbologies were first disclosed in U.S. Pat. No. 1,985,035 by Kermode and expanded shortly thereafter in the 1930's in U.S. Pat. No. 2,020,925 by Young, assigned to Westinghouse. These early symbologies were printed by generating a multiplicity of single width elements of lower reflectance, or "bars," which were separated by elements of higher reflectance, or "spaces." An "element" is a bar or space. These early symbologies, and many "bar code symbologies" used today can be referred to as "linear symbologies" because data in a given symbol is decoded along one axis or direction. Symbologies such as linear symbologies encode "data characters" (e.g., human readable characters) as "symbol characters," which are generally parallel arrangements of alternating bars and spaces that form unique groups of patterns to encode specific data characters. "Data characters" include not only human readable characters, but also include special function characters such as start, stop or shift characters that provide certain functional data. Each unique group or pattern of bars and spaces within a predetermined width defines a particular symbol character, and thus a particular data character or characters.

The known U.P.C. symbology can be described generically as a (7,2) "n,k code." An "n,k code" is defined as a symbology where each symbol character has "k" number of bars and spaces and whose total length is "n" modules long. Therefore, the U.P.C. symbology encodes two bars and two spaces in each symbol character and each symbol character is seven modules long. A "module" is the narrowest nominal width unit of measure in a bar code symbology (a one-wide bar or space). "Nominal" refers to the intended value of a specific parameter, regardless of printing errors, etc. Under common counting techniques, the number of possible symbol characters can be found by realizing that in seven modules, there are six locations where a transition can occur, and that for two bars and two spaces, there are three internal transitions. Therefore, the number of unique symbol characters for the U.P.C. symbology is simply 6 choose 3 which equals 20. Similarly, under the Code 128 symbology, which is an (11,3) symbology, 252 unique symbol characters are available (10 choose 5).

The bar code symbologies known as U.P.C., EAN, Code 11 and Codabar are all bar code symbology standards which support only numeric data characters, and a few special characters such as "+" and "−". The U.P.C. symbology is both a bar code standard, as well as an industry standard, in that it has been adopted by industry in a standard application (consumer goods). The bar code standard Code 39 was the first alphanumeric bar code symbology standard developed. However, it was limited to 43 characters.

Code 93 is an improvement over Code 39. Code 93 is a continuous bar code symbology employing four element widths. Each Code 93 symbol has nine modules that may be either black or white (either a bar or a space). Each symbol in the Code 93 standard contains three bars and three spaces (six elements), whose total length is nine modules long. Code 93, having nine modules and three bars per symbol is thus a (9,3) symbology which has 56 possible characters (8 choose 5). The Code 93 symbology standard defines only 48 unique symbols, and thus is able to define 47 characters in its character set plus a start/stop code. The 47 characters include the numeric characters 0–9, the alphabetic characters A–Z, some additional symbols and four shift codes.

The computer industry uses its own character encoding standards, namely, the American Standard Code for Information Interchange (ASCII). ASCII defines a character set containing 128 characters and symbols. Each character in ASCII is represented by a unique 7-bit code. Since Code 39 and Code 93 are limited to fewer than 50 characters, these standards are inadequate to uniquely represent each ASCII character. The four shift codes in Code 93, however, allow this standard to unambiguously represent all 128 ASCII characters. One drawback is that a series of two Code 93 symbols are required to represent a single ASCII character. Thus, bar code labels representing characters in the ASCII character set are twice as long as labels representing characters in the Code 93 character set.

New bar code symbology standards, such as Code 128, were developed to encode the complete ASCII character set, however, these standards suffer from certain shortcomings, including requiring shift codes or other preceding symbols to represent certain characters. All of these symbologies require increased processing time and overhead to process the entire ASCII character set.

The computer industry has grown beyond the limits of the ASCII character set. As the computer markets have grown, the need has also arisen to support additional languages not defined by the ASCII character set. New character sets were developed to accommodate clusters of characters in related languages. The original 7-bit ASCII character set was expanded to 8 bits thus providing an additional 128 characters or data values. This additional 128 set of data values (the "upper 128" or "extended ASCII") allowed for additional characters present in the related romance languages (i.e., French, German, Spanish, etc.) to be represented. The only linear symbologies capable of encoding 8-bit data are Code 128, and "Code 53", which is described in the inventor's U.S. Pat. No. 5,619,027, entitled "Single Width Bar Code Symbology With Full Character Set Utilizing Robust Start/Stop Characters and Error Detection Scheme." Both Code 128 and Code 53 encode 8-bit data by using single or double function shift characters, and thus require increased processing time and overhead, since every byte value must be analyzed before a data character is encoded.

As the computer markets grew internationally, however, even more languages were required to be included in the character set. Particularly, the Asian markets demanded a character set, usable on computers, which supported thousands of unique characters. To uniquely define each of these characters, a 16-bit encoding standard was required.

Several 16-bit encoding standards such as Unicode, Big Five, GB, JISC-6226-1983, and others have recently been developed. The Unicode character encoding standard is a fixed-length, uniform text and character encoding standard. The Unicode standard may contain up to 65,536 characters, and currently contains over 28,000 characters mapping onto the world's scripts, including Greek, Hebrew, Latin, Japanese, Chinese, Korean, and Taiwanese. The Unicode standard is modeled on the ASCII character set. Unicode character codes are consistently 16 bits long, regardless of language, so no escape sequence or control code is required to specify any character in any language. Unicode character encoding treats symbols, alphabetic characters, and ideographic characters identically, so that they can be used in various computer applications simultaneously and with equal facility. Computer programs using Unicode character encoding to represent characters, but which do not display or print text can remain unaltered when new scripts or characters are introduced.

New computer operating systems are beginning to support these comprehensive 16-bit code standards, e.g., WINDOWS NT, manufactured by Microsoft Corporation of Redmond, Wash. The data collection industry, however, has generally failed to keep pace with the computer industry. Only a few systems have currently been proposed for encoding the 16-bit computer character codes into bar code symbols. One of the systems, named 93i, is the subject of U.S. Pat. No. 5,557,092, and the applicant's currently pending and commonly assigned patent applications Ser. No. 08/842,644 filed on Apr. 16, 1997, and Ser. No. 08/914,324, filed on Aug. 19, 1997, which are incorporated herein, by reference, in their entirety.

Often, it will be desirable to encode and decode symbols consisting of a combination of romance language data characters, including Arabic numerals, and data characters, including numerals, from Asian languages. Since the two byte character sets such as Unicode, GB and JISC-6226-1983, usually contain the one byte character sets, such as ASCII, as subsets thereof, each of the romance and Asian language data characters can be represented by a double byte data character code selected from one of the two byte character sets. The double byte data character codes may be directly encoded into a symbol in a symbology capable of supporting a double byte character set, such as 93i. It is also possible to decode the symbol, producing a set of double byte data character codes representing the information stored in the symbol.

The substitution of double byte characters for single byte characters and the subsequent encoding of the substituted double byte characters into symbol characters results in symbols with lengths which are longer than would otherwise have been achieved had all of the single byte characters been directly encoded into symbol characters. Symbol length is critical in many bar code applications, especially when linear symbologies are employed. Therefore, there is a need to allow bar code symbols to more efficiently represent a combination of data characters selected from single byte and double byte character sets.

SUMMARY OF THE INVENTION

The present invention solves the above problems and provides additional benefits. Under one embodiment, a string of double byte character codes emanating from a computer system operating in a double byte character mode is parsed to remove any character codes corresponding to characters from a subset such as a single byte character set, for example ASCII. The character codes remaining in the parsed data string can then be encoded using a first translation suited for efficiently encoding double byte data characters into a combination of symbol values, for example Word Mode in the 93i symbology. The character codes parsed from the data stream may then be encoded using a second translation suited for efficiently encoding single byte data characters into a symbol value, such as direct encoding in 93i. The symbol values may be combined and used to operate a printer to print a symbol containing both romance and Asian language characters in an efficient manner.

Under another embodiment, a stream of symbol values is parsed to remove any symbol values corresponding to characters from a single byte character set, such as ASCII. The symbol values remaining in the parsed data stream can then be decoded using a first translation suited for decoding combinations of symbol values into data double byte data characters, for example Word Mode in 93i. The symbol values parsed from the data stream may then be decoded using a second translation suited for decoding individual symbol characters into double byte data characters. A lookup table or algorithm supplies the appropriate translations. The data character codes may be combined and delivered to a system operating in a double byte character mode.

DETAILED DESCRIPTION OF THE INVENTION

As used generally herein, the following definitions apply: "data characters" refers to human readable characters, including symbols, numeric characters, alphabetic characters, and ideographic characters, as well as non-readable data, such as function codes, shift codes, etc.; "numeric string" refers to a sequence of numeric characters, typically decimal digits; "character codes" refers to a code, typically numeric, which refers to a data character within a set of character codes and corresponding data characters, such as ASCII, where "8-bit code" refers to an extended ASCII code corresponding to a data character in the ASCII standard, and "16-bit code" or "16-bit character code" refers to a hexadecimal or decimal representation of a data character in a 16-bit character encoding standard, such as Unicode; "bar code symbology" refers to a set of machine-readable or symbol characters for uniquely representing a set of data characters; "symbol value" refers to a code such as an ordinal number representing a data character in a bar code symbology; "symbol character" refers to the unique geometric shapes or bar and space patterns used in a bar code symbology to represent particular data characters; "bar code standards" refers to a bar code symbology recognized by, or regularly used in, data collection applications (e.g. Code 128, Code 93); and, "counts" refers to a unique set of electrical signals produced when reading a symbol character corresponding to a data character in a bar code symbology.

For example, in the 16-bit character encoding standard Unicode, the data character "A" is represented by the 16-bit code "0041" in hexadecimal notation and "65" in decimal. The data character "A" has a symbol value of "10" in the bar code symbology Code 93. The symbol value 10 in Code 93 corresponds to a symbol character having a pattern of a two module width bar followed by: a single module width space, a single module width bar, a single module width space, a single module width bar, and a three module width space. The counts associated with the printing of this symbol are generally unique to each printer, and for a thermal printer, would represent the time intervals between transitions between bars and spaces to appropriately activate the printer's heating element as the thermal sensitive paper moved past it where the bars are positioned perpendicular to the direction of the label through the printer. Alternatively, the counts can indicate which dots or thermal-print elements to activate when the bars are parallel with the direction of the label through the printer.

For convenience, exemplary embodiments according to the invention will be discussed with reference to the 93i symbology, although the methods may employ other symbologies with equal success. A brief overview of the 93i symbology is given here, although the reader is referred to U.S. Pat. No. 5,557,092, and U.S. Ser. Nos. 08/842,644 and 08/914,324, for a more through understanding.

The 93i symbology encodes numeric, alpha-numeric, and the full 128 ASCII characters. Additionally, the 93i symbology encodes the extended ASCII characters and all international character sets, such as those represented by 16-bit character codes. The 93i symbology is continuous and employs a symbol structure, as described below, having six elements per symbol, with three bars and three spaces. Characters under the 93i symbology are not self-checking and symbol length is variable. The 93i symbology employs two symbol check characters or optional error correction characters. The 93i symbology supports the Extended Channel Interpretation (ECI) protocol, and is fully compatible with the existing Code 93 symbology.

Figure 1:
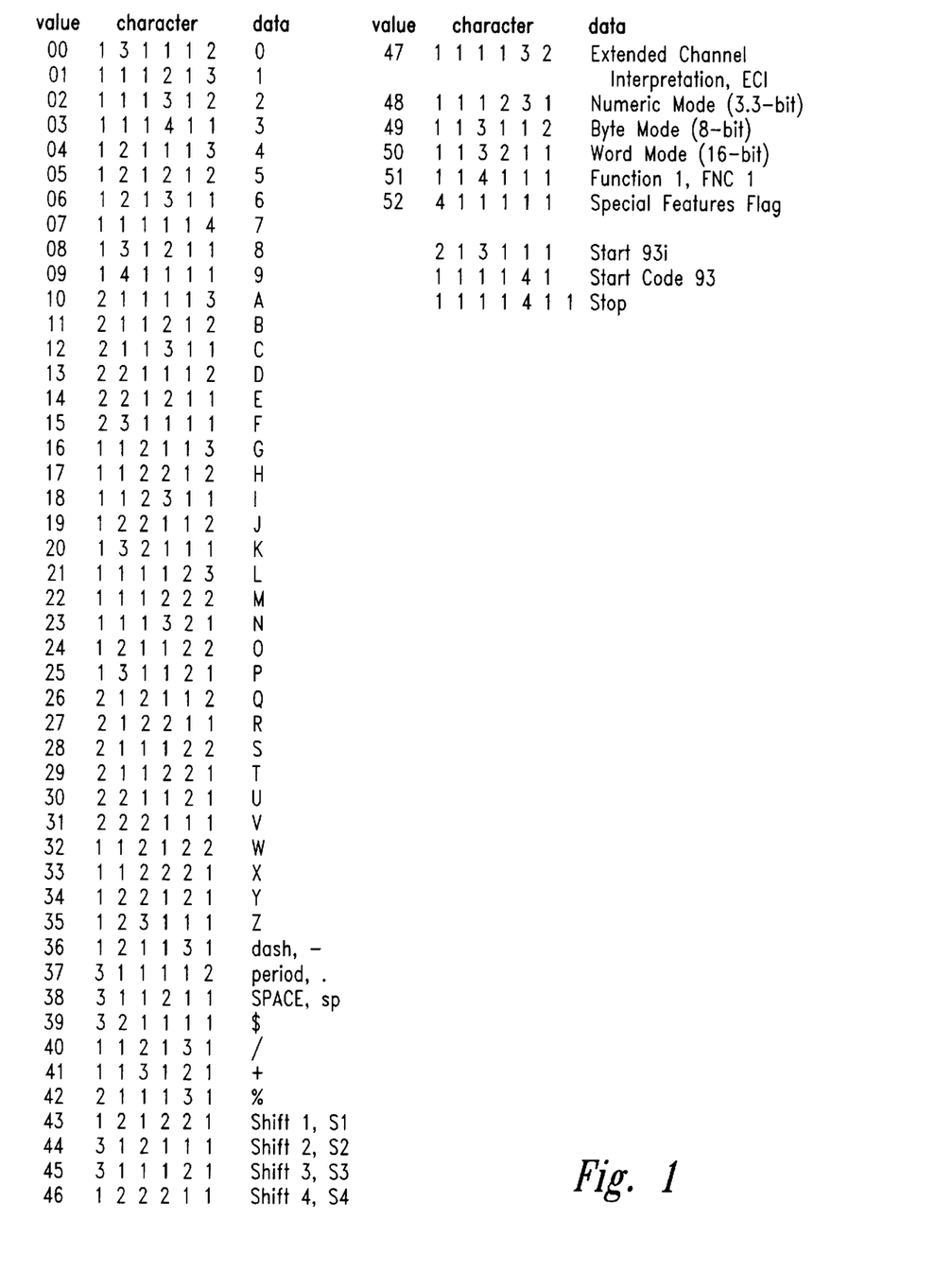
FIG. 1 is a table showing symbol values and associated symbol characters and data characters for an exemplary symbology under the present invention.

FIG. 1 shows the data character assignments for each symbol character in the 93i symbology. The "value" column in FIG. 1 represents the symbol value for each symbol character. The symbol value is used to compute not only check or error correction characters, but is also employed in various data compression methods. The "character" column in FIG. 1 lists the alternating bar and space pattern for each symbol character, where a "1" corresponds to one module, "2" corresponds to two modules, etc. Each character begins with a bar. The "data" column in FIG. 1 represents a base data character corresponding to each symbol character, or the functionality of the symbol character. As shown in FIG. 1, symbol values 00–46, and their corresponding symbol characters and data characters match the corresponding symbol values, symbol characters, and data characters in the Code 93 symbology.

The 93i symbology employs 53 symbol values, rather than the 47 employed in the Code 93 symbology. Specifically, the 93i symbology adds symbol values 47–52 and two start characters. One start character indicates that the symbol is a 93i symbol, and therefore can include symbol values 47–52. Another start character is identical to the start symbol for the Code 93 symbology, and indicates that the symbol is encoded using only valid Code 93 symbol characters.

Figure 2:
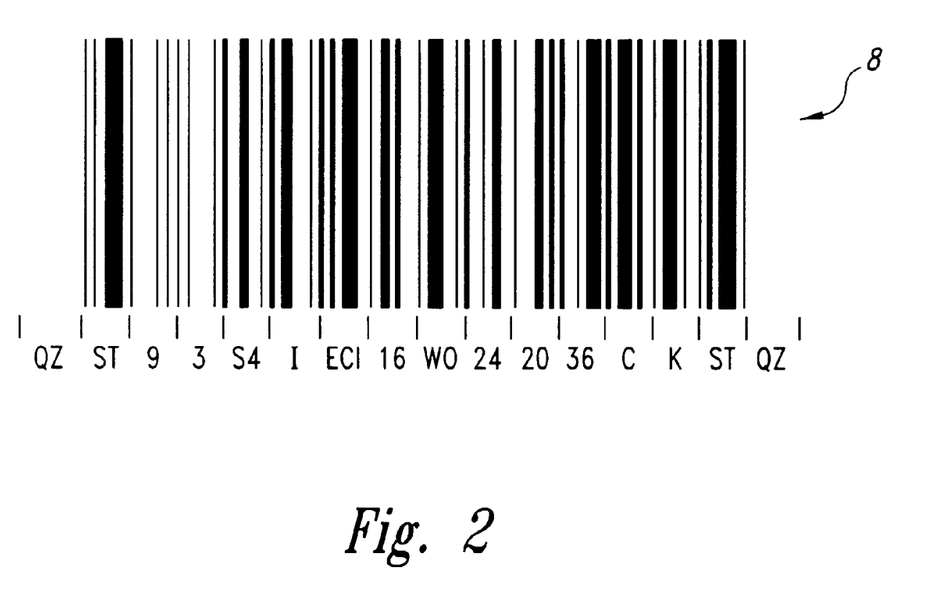
FIG. 2 is an example of a label having bar code symbol characters, encoded in a 93i symbology, for being printed or read under an exemplary embodiment of the present invention.

FIG. 2 shows the symbol characters in a label 8 (without error correction) parsed into individual symbol characters, represented by short vertical lines between each symbol character, together with the corresponding data character for each symbol character. Each symbol character in the 93i symbology employs 3 bars and 3 spaces in 9 modules. Each bar or space is 1, 2, 3, or 4 modules in width. The 93i symbology employs a leading quiet zone (QZ), one of two start symbol characters, one or more symbol characters encoding data characters, two symbol check characters (referred to as "C" and "K"), a stop symbol character, and a trailing quiet zone.

The data characters for the label of FIG. 2 are, from left to right, 9,3,i,[ECI 16], {30908}. "[ECI 16]" refers to the ECI value 000016, while "{30908}" is the Asian character having the 16-bit code 30908 in the Unicode standard (which is pronounced approximately as "MA"). As used generally herein, the term "symbol" used alone refers to a collection of symbol characters, such as those shown in the label 8. The numeric data characters "9" and "3" are encoded directly, while the data character "i" must be encoded with a shift character (as described below). As used generally herein, the term "character" used alone refers to either a data character or its corresponding symbol value. The [ECI 16] data character is formed with two symbol characters, while the Asian character {30908} employs a Word Mode discussed below. Briefly, the value 30908 is encoded under the formula $(16*43^2)+(30*43)+34$. As a result, the symbol values for the resulting string of symbol characters for encoding the data is: [09][03][46][18][47][16][50][16][30][34].

Figure 3:
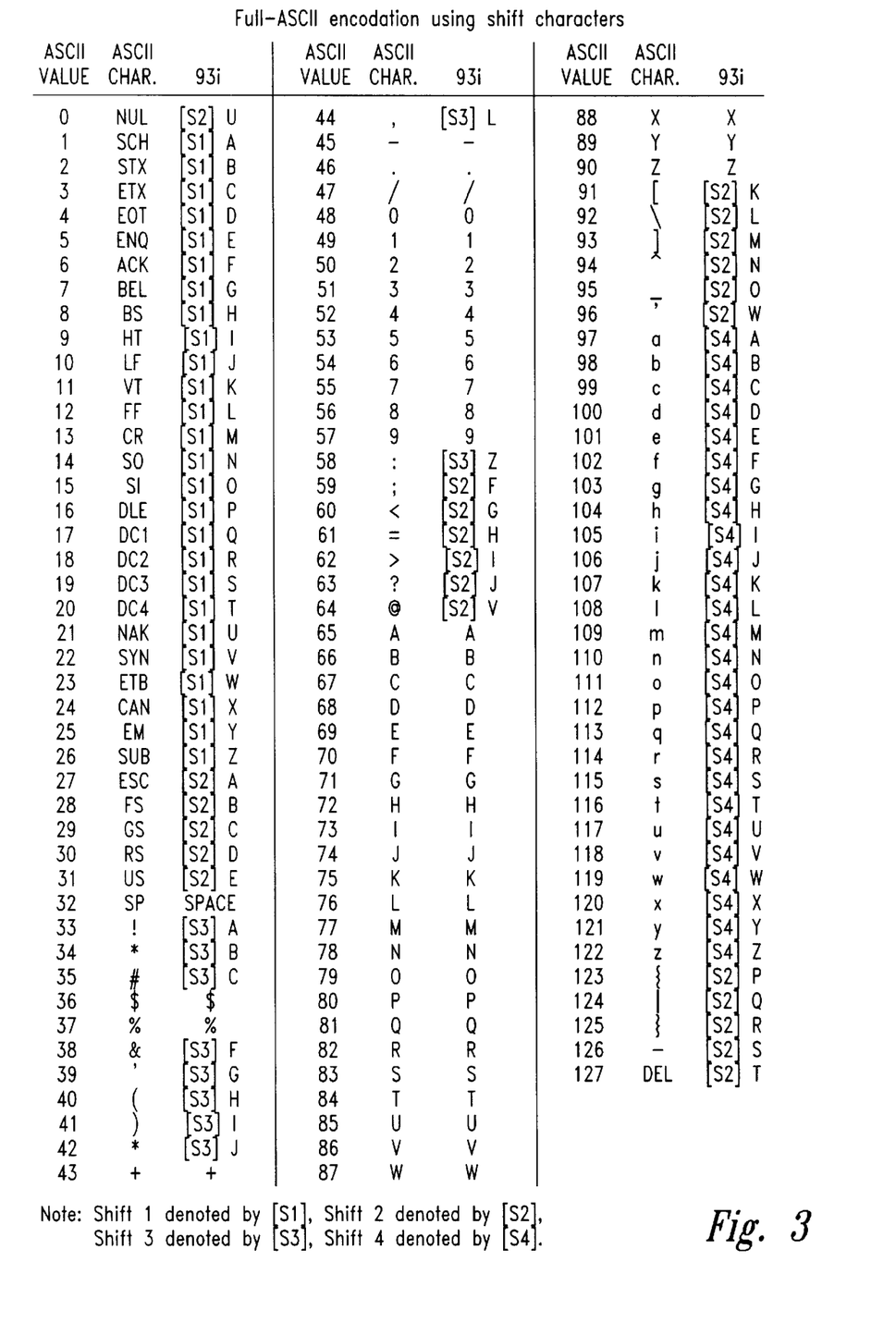
FIG. 3 is a table showing full ASCII data characters encodable under the symbology of FIG. 1.

The 93i symbology includes, as a subset thereof the data characters of the ASCII data character set. FIG. 3 shows the 93i symbology symbol character assignments for each data character in the ASCII data character set. The "ASCII Value" column in FIG. 3 represents the ASCII value assigned to the respective data character in the "ASCII Character" column. The "93i" column includes the one or two 93i symbology data characters assigned to the respective ASCII data characters.

Figure 4:
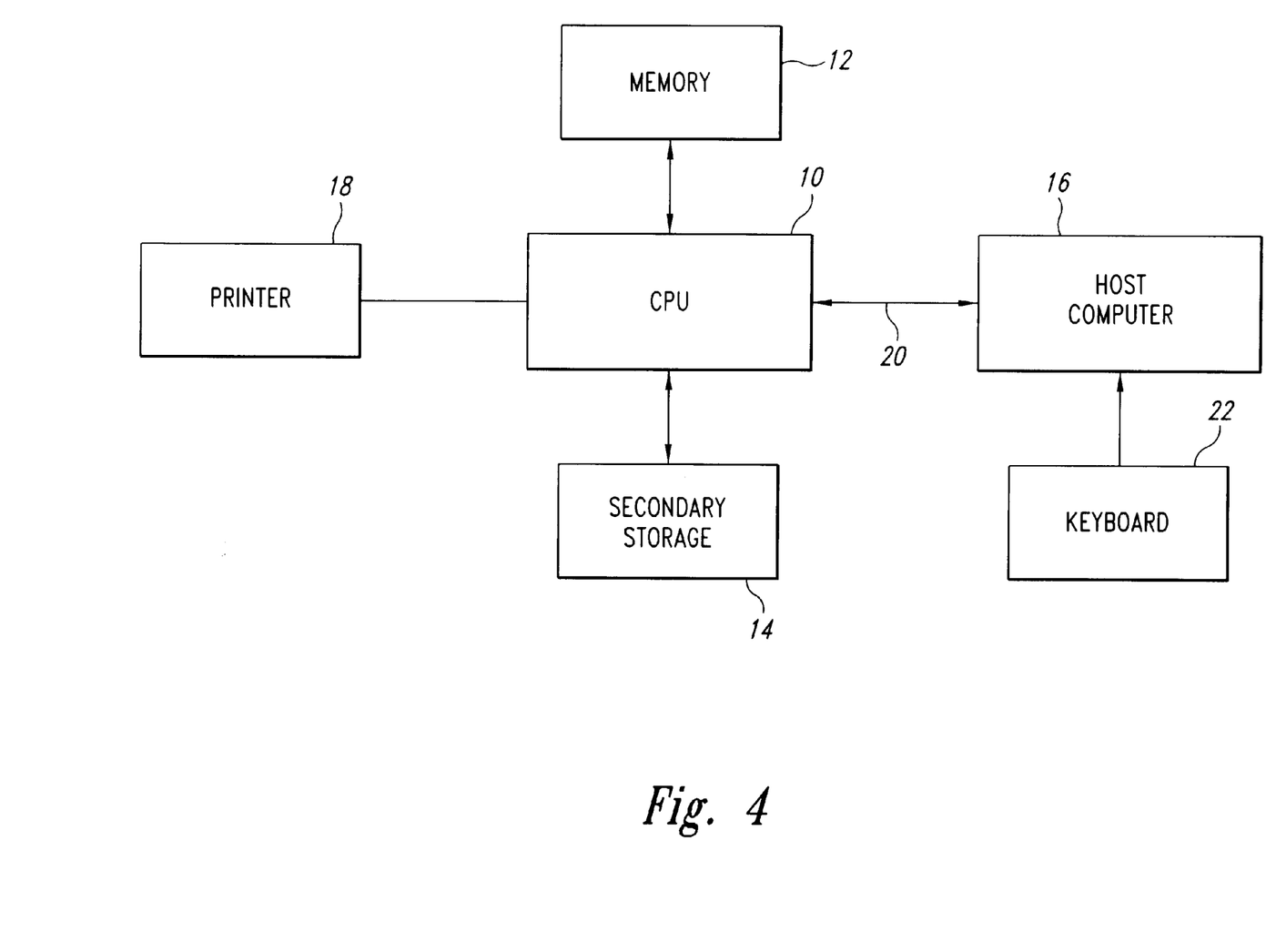
FIG. 4 is a block diagram of a bar code symbol printing apparatus of the present invention.

FIG. 4 shows an exemplary embodiment of a system employing the inventive method for encoding a plurality of data characters into a symbol. The system includes a CPU 10, a memory 12 and secondary storage 14 coupled to the CPU 10. The CPU 10 is in data communication with a 16-bit host computer 16 and a printer 18. The printer 18 is of a type generally known which can print bar codes and human readable data characters. Those skilled in the art may select from any such printers which are suitable for use in the present invention. The CPU 10 is electrically coupled to a host computer 16, or other apparatus or applications, by a port or line 20.

The host computer 16 is generally capable of working only with 16-bit data character encoding standards, for example, Unicode, JISC-6226-1983, Big Five, GB, or KSC 5609-1987. The JISC-6226-1983 standard is the Japan Industrial Standard Character set, mapping the kanji and katakana data characters into 16-bit codes. This data character standard is similar to Unicode, which, as noted above, includes the kanji and katakana data characters, among others. However, each data character in the JISC-6226-1983 standard is assigned a different 16-bit code for the equivalent data character in the Unicode standard.

The host computer 16 transmits a string of 16-bit character codes to the CPU 10 along the line 20. The string of 16-bit character codes may be or may have been generated from a keyboard 22 which is associated with the host computer 16 for entering data therein. When a key is depressed on the keyboard 22, the keystroke is converted into a "scan code" which is transmitted from the keyboard 22 to the device to which the keyboard is connected (e.g., the host computer 16). This scan code represents the particular key of the keyboard which has been depressed. The device to which the keyboard is connected translates the appropriate scan codes into corresponding character codes in the resident data character set, such as ASCII on an 8-bit machine or Unicode on a 16-bit machine.

Upon receipt of the string of 16-bit character codes, the CPU 10 executes a set of instructions 26 stored in the memory 12 to convert the character codes into an optimized set of symbol characters as represented by a set of counts for driving the printer 18.

The printer 18 interprets these counts and converts them into printed symbol characters, typically in the form of a bar code label. A "label" generally refers to any paper, cloth, plastic, metal or other pliable or rigid material suitable for having one or more symbol characters and/or data characters printed or formed thereon. Those skilled in the relevant art, however, will recognize that the term "label" also refers to any symbol characters printed on an object, such as packaging for a consumer product, or relief formed on an object. The printed label can include both symbol characters and the corresponding human readable data characters. The label 8 of FIG. 2 is an example of a label printed or read under embodiments of the present invention.

Figure 5:
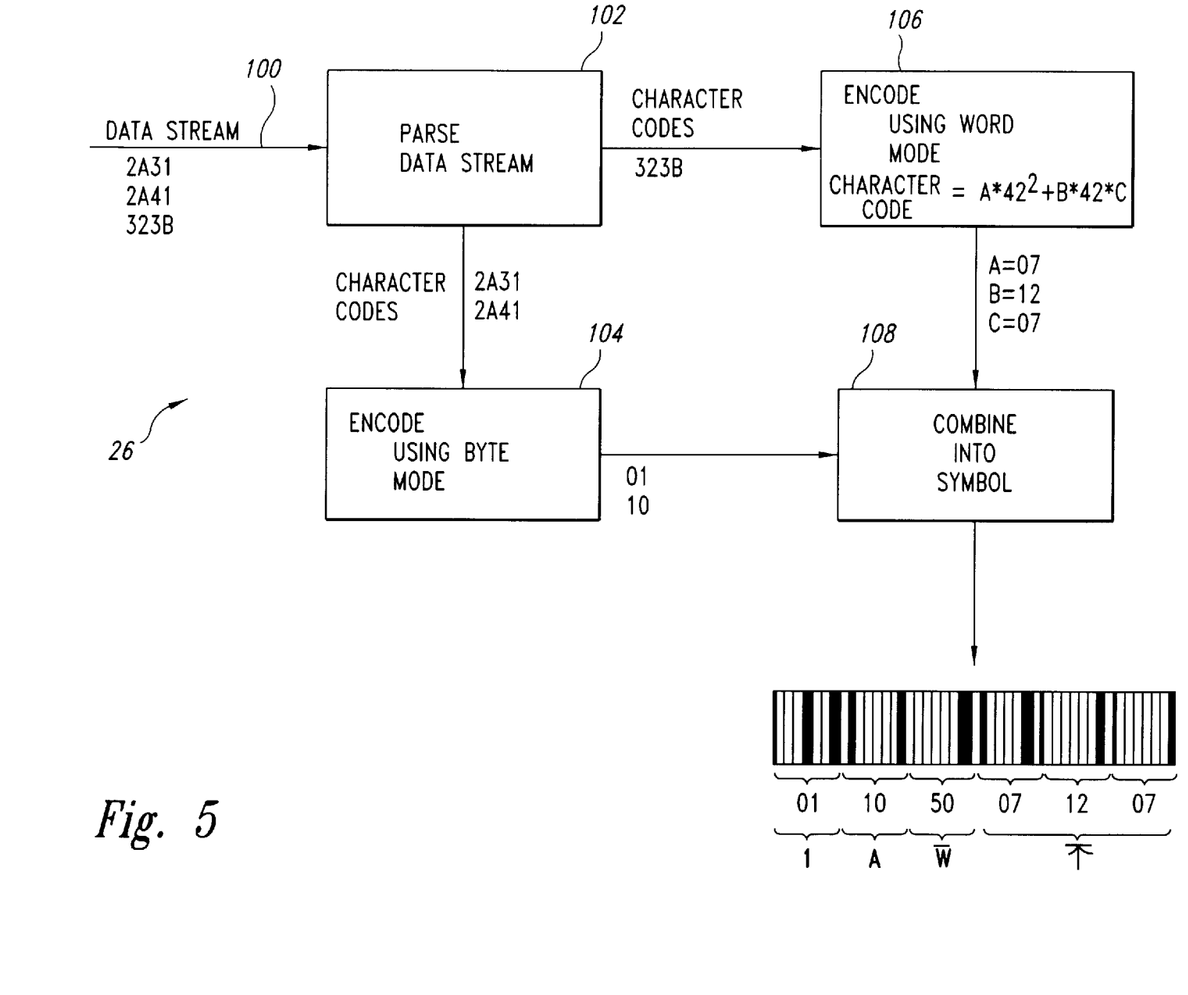
FIG. 5 is an exemplary flow chart showing the basic steps performed by the printing apparatus of FIG. 4 for printing bar code symbols under the exemplary embodiment.
Figure 8:
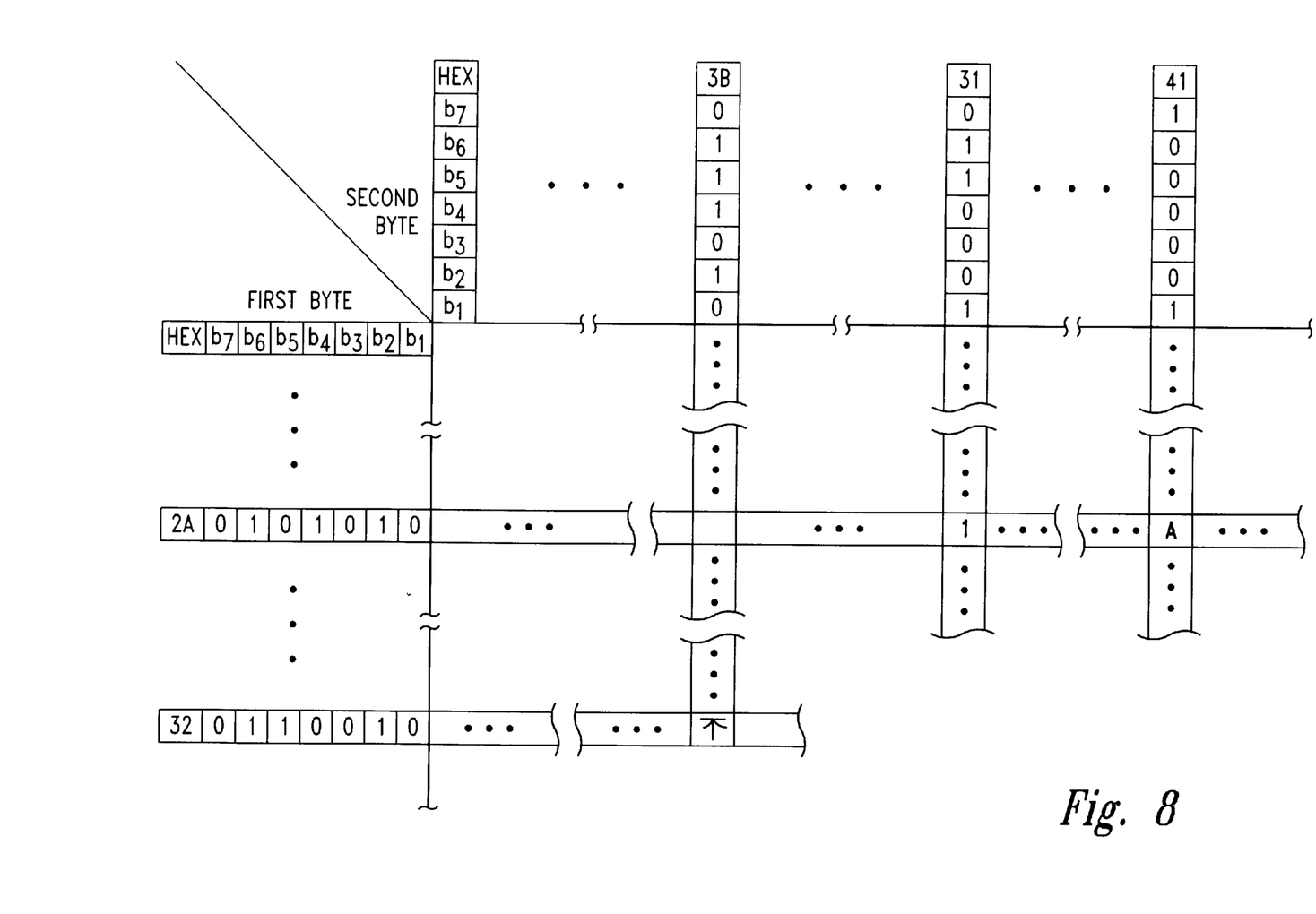
FIG. 8 is a table showing the mapping between data characters and character values in hexadecimal and binary for selected characters from the GB character set.

FIG. 5 shows exemplary steps performed by the CPU 10 under the set of instructions 26 for printing a bar code label having multiple symbol characters with corresponding data characters. In the example of FIG. 5, the data characters are the characters "1" and "A" selected from the romance language characters, and a character selected from an Asian language represented in the GB character set which is approximately pronounced as "Bu" in Mandarin. FIG. 8 is a table which shows the data characters "1", "A" and "Bu" along with their respective character values in the GB character set. The character values are composed of a first byte of seven binary digits and a second byte of seven binary digits. As shown in FIG. 8, each byte may be represented by two hexadecimal characters. With continuing reference to FIG. 5, in step 100, the string of 16-bit characters codes (i.e., "2A312A41323B") is received from the host computer 16. In step 102, the CPU 10 divides, separates or parses the character codes ("2A31" and "2A41") that correspond to the double byte data characters found in the ASCII character set, from the string. In this example a single character code ("323B") is left in the string. Data parsing techniques are well known in the relevant art. For example, since many of the 16-bit standards encode subsets of data characters, such as ASCII, at predefined offsets in memory, these data characters are easily identified. The GB system assigns character codes which contain the value 2A (Hexadecimal) in the upper byte to some of the data characters from the ASCII character set, while the lower byte corresponds directly to the ASCII value of the character, for example "2A31". Thus character codes corresponding to the ASCII characters are easily identifiable. One skilled in the art will realize that it does not matter which set of character codes is parsed from the string or the manner in which the parsing is performed, so long as the character codes corresponding to the different character sets may be operated on separately.

In step 104, the CPU 10 determines an optimized string of symbol characters for each of the data characters corresponding to the character codes not parsed from the string of character codes (i.e., "323B"). Most symbologies employ shift codes or preceding codes and would normally require two symbol characters for encoding each byte of the two byte character code. Thus, a total of four symbol characters are required to encode a single two byte data character, such as an Asian language character.

However, the CPU 10 may employ a compaction scheme, such as the Word Mode described in applicant's pending applications, Ser. Nos. 08/842,644 and 08/914,324. Under the Word Mode compaction scheme, three symbol characters are grouped so that their corresponding three symbol values encode a single 16-bit value. Thus, three symbol characters can encode Asian characters or 16-bit character codes. Character codes up to 65,536 are encoded under equation (1) below.

$$A*43^2+B*43+C \qquad (1)$$

The result of step 104 is a set of three symbol values for each of the data characters remaining in the string of data characters, the symbol values corresponding to the variables A, B and C from equation (1). Each of the symbol values in the set has a value from 0–42, inclusive. For the character code 323B the values of A, B and C are 7, 12 and 7, respectively.

In step 106, the CPU 10 determines an optimized string of symbol characters for each of the character codes ("2A31" and "2A41") parsed from the string of character codes. For data characters which are "native" to the symbology, (e.g. the symbology includes a single symbol character corresponding to the data character), the optimized string consists of a single symbol character. For example, in the 93i symbology each of the data characters 0–9 and A–Z, may be represented by a single symbol character, having symbol values 00–35, respectively. Therefore, the CPU 10 assigns a single symbol value for each character code in the string that corresponds to one of the data characters 0–9 and A–Z. Thus, the CPU 10 initially strips the upper byte "2A" from the two parsed character codes. Thereafter, the CPU 10 converts the remaining bytes "31" and "41" under ASCII to their corresponding 93I symbol values, "01" and "10", respectively.

Where the symbology requires a shift code to represent the particular data character, the optimized string may consist of two symbol characters. For example, the 93i symbology employs a one to one correspondence between symbol characters and the ASCII data characters 0–9, A–Z, and some punctuation characters, as shown in FIG. 1. To encode additional ASCII characters, such as lower case alphabetic characters a–z, at least one shift character S1 through S4 is required. Therefore, two symbol characters can be required to represent one lower case alphabetic ASCII data character under the 93i symbology. Two symbol characters is still a savings over three symbol characters if the CPU 10 were simply to encode each Unicode character into three symbol characters.

Thus, the CPU 10 under step 106 identifies any ASCII characters that cannot be represented by a single symbol character under the 93i symbology. The CPU 10 then identifies the appropriate shift codes to optimally represent strings of one or more ASCII data characters that cannot be represented by only a single symbol character, but which can be represented by fewer than three symbol characters per data character.

In executing step 106, the CPU 10 may employ one or more compaction schemes, such as the Byte Mode and the Numeric Mode described in U.S. Ser. Nos. 08/842,644 and 08/914,324, to further optimize the symbol character string. For example, under the Byte Mode, the 93i symbology efficiently encodes strings of full or extended ASCII data or straight byte data. A "byte" typically refers to an 8-bit set of data. Under the following equation (2), a double-byte, or two 8-bit bytes, are encoded for each of three symbol characters:

$$A*43^2+B*43+C \qquad (2)$$

where A, B, and C are 93i symbol values between 0 and 42.

Under equation (2) two bytes having a combined value between 0 and 65,535 are encoded as two symbol characters (i.e., $2^{16}$=65,536). Values resulting from equation (2) between 65,536 to 75,535 encode four digits, while values 75,535 to 76,535 encode three digits. As a result, the Byte Mode provides a 3- and 4-digit numeric compaction method to improve the information density for encoding strings of numeric characters while in Byte Mode. Values resulting from equation (2) between 76,536 and 79,506 are not defined, and cause a reader to fail a decode and output an error signal.

Several encoding strategies for improving symbol character encoding efficiency are permitted in Byte Mode under the 93i symbology, which are described in detail in U.S. Ser. No. 08/914,324.

In yet another efficient character encoding scheme, Numeric Mode, five numeric digits are represented by three symbol characters, where the symbol characters each have a symbol value within the range of 0–47. The five digit numeric string is produced by the equation $$A*48^2+B*48+C \qquad (3)$$

where A, B and C are 93i symbol values. When a string of digits is encoded which is greater than five, but not an exact multiple of five, the following four rules should apply. First, one digit more than a multiple of five in a string is directly encoded by a single symbol character (symbol values 00–09). Second, if the numeric string contains two more digits than a multiple of five, the last seven digits are separated into a set of four digits followed by a set of three digits, which are each represented as described by the third and fourth rules below. Third, if a numeric string contains three digits more than a multiple of five, the three digits at the end of the string are represented by two symbol characters according to the equation $$48*A+B \qquad (4)$$

again, where A and B are 93i symbol values. Fourth, if a numeric string contains four digits more than a multiple of five, the last four digits are encoded in three symbol characters under equation (3) above, where the resulting value under equation (3) is between 100,000 and 109,999.

In the 93i symbology, symbol values 48, 49 and 50 cause the CPU to toggle into and out of Word Mode, Byte Mode and Numeric Mode, respectively.

In executing step 106 the CPU 10 determines the symbol value for each data character. A table of data characters and their corresponding symbol values is preferably stored in the secondary storage 14, along with the counts for the corresponding symbol characters, such as the tables of FIGS. 1 and 3. Alternatively, the symbol values can be automatically calculated from knowledge of the data characters. The CPU 10 encodes selected data characters into symbol characters selected from the table of FIG. 1 based on the appropriate routine described herein. For example, if bytes are to be encoded, then the CPU 10 employs the equation (2). If the CPU 10 encounters a string of three or five digits, the CPU employs equations (3) and (4), respectively, which are described above. In step 108, the symbol values are combined into a valid symbol. The symbol values may be provided to the printer 18 in the form of counts arranged in an appropriate order.

Figure 6:
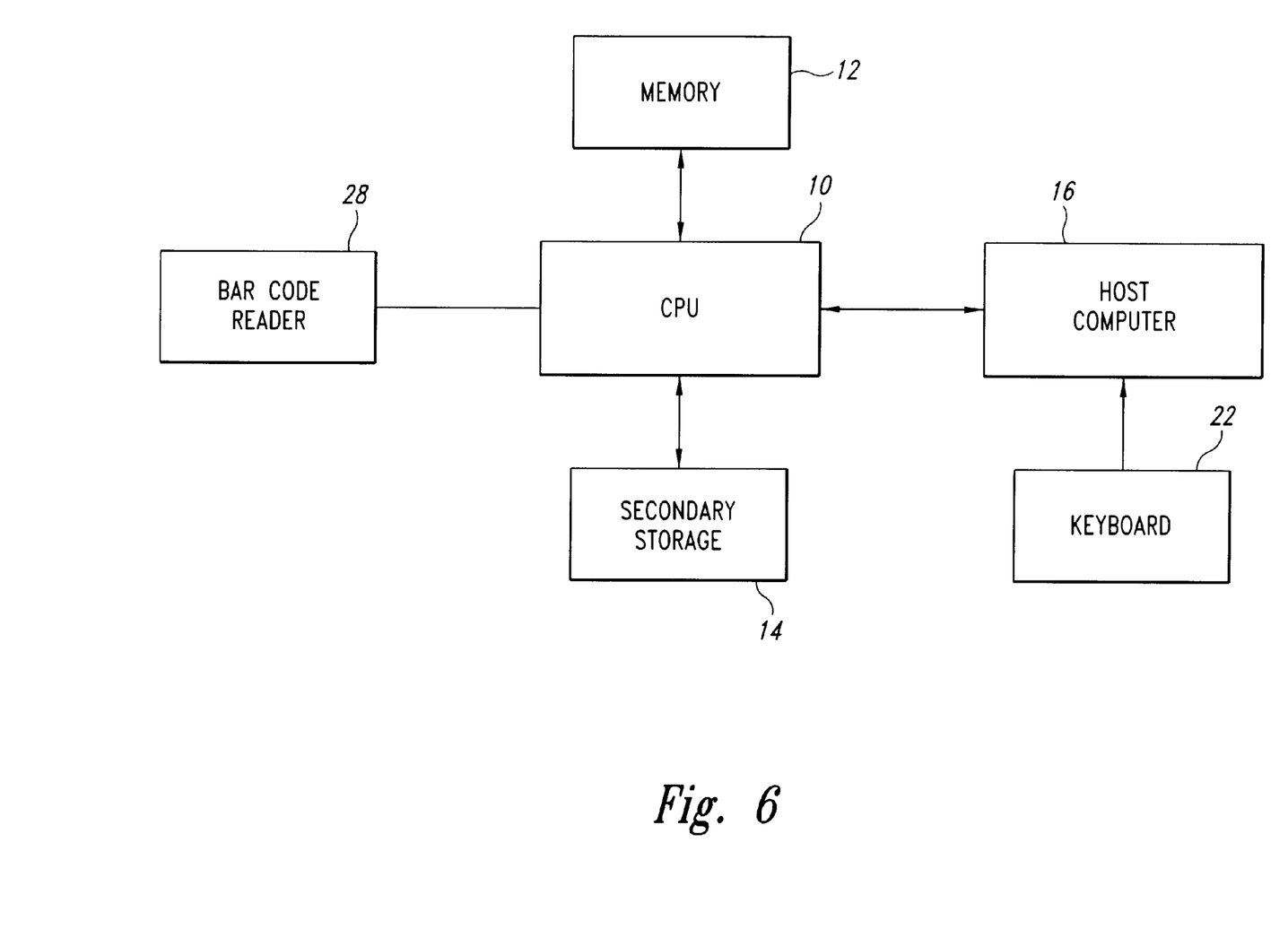
FIG. 6 is a block diagram of a bar code symbol reading apparatus of the present invention.

FIG. 6 shows an exemplary embodiment of a system employing the inventive method for decoding a symbol composed of a plurality of symbol characters. The system includes the CPU 10, memory 12 and secondary storage 14 coupled to the CPU 10. The CPU 10 is in data communication with the 16-bit host computer 16 and a bar code reader 28. The bar code reader 28 includes an electro-optical device such as a laser scanner, rasterizing laser, or wand-based optical transducer (not shown). Alternatively, the electro-optical device in the reader 28 can include a one- or two-dimensional CCD, semiconductor array, vidicon, or other area imager capable of converting received light into electrical signals. The electro-optical device in the reader 28 can also include a light source such as an LED, flash bulb, infrared light source, or other light-emitting element. As used generally herein, the term "reader" refers to any device capable of converting modulated light received from a bar code into electrical signals. Readers are known by those skilled in the art, and any such reader suitable for use in the present invention can be selected.

The bar code reader 28 scans or images the symbol characters of a bar code label and determines the width of the elements, e.g., by determining a series of counts. As is known by those skilled in the art, the transitions between bars in the symbol characters, together with a timer within the reading apparatus 140, determine the counts of the symbol characters read. The counts in turn are used to determine the widths of elements in a given symbol. A decoder which may be integral to the bar code reader 28 converts the determined widths into a stream of symbol values.

The bar code reader 28 transmits a string of symbol values to the CPU 10 along a line 30. The string of symbol values correspond to symbol characters which represent data encoded in the symbol. Upon receipt of the string of symbol values, the CPU 10 executes a set of instructions 32 stored in the memory 12 to convert the symbol values into a set of character codes for transmission to the host computer 16 along the line 20. Alternatively, the data can be transmitted between the bar code reader 28, and, or the host computer 16 via a wireless link.

Figure 7:
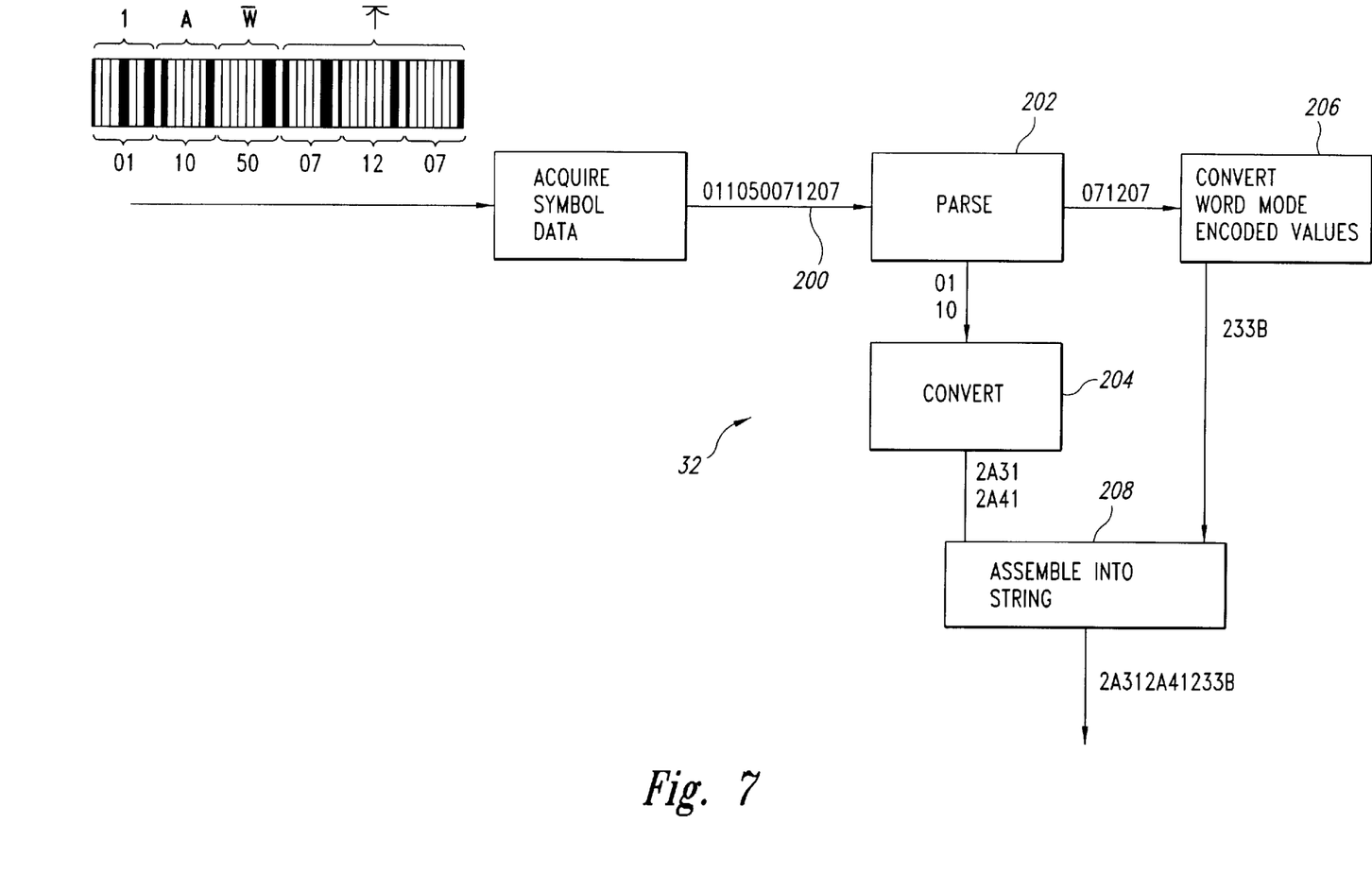
FIG. 7 is a flow chart showing the basic steps performed by the reading apparatus of FIG. 6 for reading bar code symbols under the exemplary embodiment.

FIG. 7 shows exemplary steps performed by the CPU 10 under the set of instructions 32 for decoding the bar code label. In step 200, a string of symbol values is received from the bar code reader 28. The each of the symbol values correspond to a symbol character in the particular symbology. In step 202, the CPU 10 divides or parses the symbol characters into various sets of symbol characters. Data parsing techniques are well known in the relevant art. For example, in the case of the 93i symbology, special codes (i.e. "48","49","50") toggle into and out of different encoding modes. The CPU 10 may use these special codes to appropriately parse the symbol values.

In the example given in FIG. 7, the first symbol value received by the CPU 10 is "01". Since the CPU has not received a special code to toggle modes, the CPU 10 recognizes that the first symbol value and following symbol values are directly encoded as 93i "native" characters. The CPU 10 parses the symbol values from the string until a special mode symbol value is encountered. Thus symbol values 01 and 10 (in Decimal) are parsed from the string. Upon receiving a symbol value equal to 50, the CPU 10 determines that the following symbol values are encoded in the Word Mode. The CPU 10 leaves the symbol values ("7" "12" and "7" in Decimal) following the Word Mode symbol value ("50" in Decimal) in the data stream, effectively separating symbol values corresponding to single byte data characters from symbol values corresponding to double byte data characters.

In step 204, the CPU 10 converts the parsed symbol values ("01" and "10") into character codes. In the example of FIG. 7, the symbol values "01" and "10" correspond to the data characters "1" and "A", respectively. The ASCII values for the data characters "1" and "A" are "31" and "41", respectively. The GB character set assigns each ASCII data character a symbol value which contains the corresponding ASCII assigned character code in a lower byte and the value "2A" (in Hexadecimal) in the upper byte. Hence, in step 204, the CPU 10 prepends the value "2A" (in Hexadecimal) to each of the ASCII character codes. Step 204 results in the following 16-bit character code stream "2A31" and "2A41" (in Hexadecimal), which corresponds to the data characters ("1" and "A"), respectively. The CPU 10 may use a table lookup approach, or may employ an algorithm.

In step 206, the CPU 10 converts any symbol values remaining in the data stream ("7" "12" and "7") into character codes ("323B" in Hexadecimal) which correspond to their respective data characters (pronounced approximately as "Bu" in Mandarin Chinese).

In step 208, the character codes from the steps 204 and 206 are combined to produce a string of two byte character codes (2A312A41323B), suitable for transmission and use by the host computer 16, and which correspond to the data encoded in the symbol.

Although specific embodiments of, and examples for, the present invention have been described above for illustrative purposes, various equivalent modifications may be made without departing from the spirit and scope of the invention. For example, if the memory 12 is sufficiently large to contain all data required by the CPU 10 for encoding, decoding, printing or reading bar code labels, the secondary storage 14 is unnecessary and thus eliminated. Alternatively, the data required by the CPU 10 may be contained in the secondary storage 14, thus eliminating the need for a large memory 12 or the need for this memory entirely. Regarding the 93i symbology, the symbol characters can be allocated to different data characters than as described above with respect to FIG. 1.

While the exemplary embodiment is discussed in terms of double byte and single byte characters and codes, one skilled in the art will recognize that the system and methods disclosed will work for any character set which encodes a smaller character set therein. That is, the method may be employed where the number of bits required to represent a character from a smaller character set is smaller than the number of bits required to represent a character from a larger character set that includes the characters of the smaller character set therein. The assignment of 8 bits to a byte and 16 bits to a word is a convenient convention for digital computers. The terms byte, single byte and double byte do not have to necessarily correspond to 8-bits and 16 bits, respectively. They could apply equally well to, for example 16-bit and 32-bit segments. Alternatively, as used in the specification and claims, a double byte does not necessarily contain twice as many bits as a single byte. For example, a double byte system of 16-bit characters can encode a single byte system such as ASCII, which only requires 7-bits in the unextended version.

Additionally, the present invention can incorporate the teachings of the U.S. Patents and/or applications described herein to provide additional benefits and functionality. The U.S. Patents and applications cited above are incorporated herein by reference as if set forth in their entirety. Features of the present invention can be applied to other symbologies.

Furthermore, aspects of the method have been generally described herein as being incorporated into a linear bar code symbology, 93i; alternatively, such aspects of the method can be employed in a stacked symbology such as PDF417 or in an area symbology such as Code One.

These and other changes can be made to the invention in light of the above detailed description. In general, in the following claims, the terms should not be construed to limit the invention to the specific embodiments disclosed in the specification and claims, but should be construed to include all apparatus, methods and symbologies for directly encoding and decoding various data characters, such as 8-bit bytes, 16-bit character codes, double bytes, etc. Accordingly, the invention is not limited by the disclosure, but instead its scope is to be determined entirely by the following claims.

It is claimed:

1. A method of encoding a data string into a bar code symbol, the data string comprising a plurality of data characters, the data characters selected from a double byte character set of human readable characters, a number of the data characters also being contained in a single byte character set which is a subset of the double byte character set, the method comprising the steps of:

determining a plurality of character codes corresponding to the plurality of data characters, the character codes selected from a first set of character codes, the first set of character codes being mapped to the first set of data characters;

parsing the data string to separate the double byte character codes of characters from the single byte character set from the data string;

converting the double byte character codes in the parsed data string into double byte symbol values;

converting the double byte character codes parsed from the data string into single byte symbol values; and outputting the double byte symbol values and the single byte symbol values to form the bar code symbol.

2. The method of claim 1, wherein the step of outputting the symbol values includes the steps of:

calculating a set of counts corresponding to the symbol values; and operating a printer based on the set of counts to print the symbol.

3. The method of claim 1, further comprising the steps of:

receiving a plurality of scan codes;

parsing the plurality of scan codes; and determining a plurality of character codes based on the parsed scan codes.

4. The method of claim 1, wherein the double byte character set is GB and the single byte character set is ASCII, and wherein the step of parsing comprises the step of examining the data values for the string equal to Hexadecimal 2A.

5. The method of claim 1, wherein the step of parsing comprises the step of examining a predefined memory location for a predefined value.

6. A method of encoding a data string into an optical symbol, the encoding method comprising the steps of:

receiving the data string comprising a plurality of double byte character codes, the double byte character codes corresponding to data characters from a double byte character set, a number of the data characters from the double byte character set also belonging to a single byte character set, the optical symbol comprising a number of symbol characters;

parsing the data string to separate the double byte character codes of data characters in the single byte character set from the data string;

converting each of the double byte character codes parsed from the data string into one symbol value;

converting each of the double byte character codes in the parsed data string into a combination of symbol values; and outputting the symbol values.

7. The method of claim 6, further comprising the steps of:

receiving a string comprising a plurality of data characters, the data characters selected from the double byte character set and the single byte character set;

determining a plurality of character codes corresponding to the plurality of data characters, the character codes selected from the set of double byte character codes; and outputting the plurality of double byte character codes as the data string.

8. The method of claim 6, wherein the step of outputting the double byte symbol values includes the steps of:

calculating a set of counts corresponding to the double byte symbol values; and operating a printer based on the set of counts to print the symbol.

9. The method of claim 6, further comprising the steps of:

receiving a plurality of scan codes;

parsing the plurality of scan codes; and determining the plurality of double byte character codes based on the parsed scan codes.

10. The method of claim 6, wherein the double byte character set is GB and the is single byte character set is ASCII and wherein the step of parsing comprises the step of examining the character codes for a string equal to Hexadecimal 2A.

11. The method of claim 6, wherein the step of parsing comprises the step of examining a predefined memory location for a predefined value.

12. A method of encoding a data string into a symbol, the method of encoding comprising the steps of:

receiving the data string comprising a plurality of character codes selected from a first set of character codes, wherein the first set of character codes map to a first set of data characters, and wherein a second set of data characters form a subset of the data characters in the first set of data characters;

converting each of the plurality of character codes corresponding to data characters contained only in the second set of data characters into a first defined number of symbol values;

converting each of the plurality of character codes corresponding to characters in both the first and the second sets of data characters into a second defined number of symbol values, the second defined number of symbol values being greater than the first defined number of symbol values; and outputting the converted symbol values.

13. The method of claim 12 wherein the first defined number is one and the second defined number is three.

14. The method of claim 12, further comprising the steps of:

receiving a string comprising a plurality of data characters, the data characters selected from the first set of data characters and the second set of data characters;

determining a plurality of character codes corresponding to the plurality of data characters, the character codes selected from the first set of character codes; and outputting the plurality of character codes as the data string.

15. The method of claim 12, wherein the step of outputting the symbol values includes the steps of:

calculating a set of counts corresponding to the symbol values; and operating a printer based on the set of counts to print the symbol.

16. The method of claim 12, further comprising the step of:

printing symbols corresponding to the converted symbol values.

17. The method of claim 12, further comprising the steps of:

receiving a plurality of scan codes;

parsing the plurality of scan codes; and determining a plurality of character codes based on the parsed scan codes.

18. The method of claim 12, further comprising the step of parsing the data string to separate the character codes corresponding to data characters only included in the second set of data characters from the character codes corresponding to data characters include in both the first and the second sets of data characters.

19. The method of claim 12, wherein the first set of data characters is GB and the second set of data characters is ASCII, and wherein the step of parsing comprises the step of examining the data values for a string equal to Hexadecimal 2A.

20. The method of claim 12, wherein the step of parsing comprises the step of examining a predefined memory location for a predefined value.

21. A method of encoding a data string into a symbol, the method of encoding comprising the steps of:

receiving the data string comprising a plurality of character codes selected from a first set of character codes, wherein the first set of character codes map to a first set of data characters, and wherein a second set of data characters form a subset of the data characters in the first set of data characters;

parsing the data string to remove all character codes corresponding to the data characters contained in the second set of data characters;

converting each of the character codes in the parsed data string into a first defined number of symbol values, and converting the character codes parsed from the data string into a second defined number of symbol values, where the second defined number of symbol values is greater than the first defined number of symbol values; and outputting the converted symbol values corresponding to the parsed character codes and the converted symbol values corresponding to the parsed data string.

22. The method of claim 21, wherein the first defined number is one and the second defined number is three.

23. The method of claim 21, further comprising the steps of:

receiving a string comprising a plurality of data characters, the data characters selected from the first set of data characters and the second set of data characters;

determining a plurality of character codes corresponding to the plurality of data characters, the character codes selected from the first set of character codes; and outputting the plurality of character codes as the data string.

24. The method of claim 21, wherein the step of outputting the symbol values includes the steps of:
calculating a set of counts corresponding to the symbol values; and
operating a printer based on the set of counts to print the symbol.

25. The method of claim 21, further comprising the step of:
printing symbols corresponding to the converted symbol values.

26. The method of claim 21, further comprising the steps of:
receiving a plurality of scan codes;
parsing the plurality of scan codes; and
determining a plurality of character codes based on the parsed scan codes.

27. The method of claim 21, wherein first set of data characters is GB and the second set of data character is ASCII, and wherein the step of parsing comprises the step of examining the data values for the string equal to Hexadecimal 2A.

28. The method of claim 21, wherein the step of parsing comprises the step of examining a predefined memory location for a predefined value.

29. A method of decoding a string of symbol values, the method comprising the steps of:
receiving the string of symbol values selected from a set of symbol values, wherein the set of symbol values map to a set of data characters comprising a set of double byte data characters and a subset of single byte data characters;
parsing the string to separate the symbol values corresponding to the single byte characters from the symbol values corresponding to the double byte characters;
converting each pair of the symbol values corresponding to a double byte character into one character code from a first set of character codes, and converting each of the symbol values corresponding to a single byte character into one character code from the first set of character codes; and
assembling the character codes into a string of character codes.

30. The method of claim 29, further comprising the steps of:
imaging a symbol, the symbol comprising a plurality of symbol characters;
converting the imaged symbol into a data string comprising a plurality of symbol values, the symbol values corresponding to the symbol characters; and
outputting the plurality of symbol values as the data string of symbol values.

31. The method of claim 29, wherein the step of converting each of the symbol values corresponding to a single byte character into one character code from the first set of character codes comprises the steps of:
converting the single byte symbol value into a single byte character code; and
converting the single byte character code into the double byte character code.

32. The method of claim 29, further comprising the steps of:
imaging a symbol to produce a signal representative of each of a plurality of symbol characters comprising the symbol;
analyzing the signal to identify the symbol characters; and
converting each of the symbol characters into a corresponding symbol value selected from the set of symbol values.

33. A method of decoding a data string, the decoding method comprising the steps of:
receiving the data string comprising a plurality of symbol values selected from a first set of symbol values, wherein each of the symbol values in the first set of symbol values map to a first set of data characters including at least one shift data character;
identifying any symbol values corresponding to the shift data characters;
converting each identified symbol value and a defined number of subsequent symbol values into one character code, and converting each of the unconverted symbol values into one character code, the character codes selected from a first set of character codes; and
assembling the character codes into a data string.

34. The method of claim 33, further comprising the steps of:
imaging a symbol, the symbol comprising a plurality of symbol characters;
converting the imaged symbol into a data string comprising the plurality of symbol values, the symbol values corresponding to the symbol characters; and
outputting the data string of symbol values.

35. The method of claim 33, wherein the step of converting each of the unconverted symbol values comprises the steps of:
converting each of the single byte symbol values into a single byte character code; and
converting each of the single byte character codes into the double byte character code.

36. The method of claim 33, further comprising the steps of:
imaging a symbol to produce a signal representative of each of a plurality of symbol characters comprising the symbol;
analyzing the signal to identify the symbol characters; and
converting each of the symbol characters into a corresponding symbol value selected from the set of symbol values.

37. A method of decoding a data string, the decoding method comprising the steps of:
receiving the data string comprising a plurality of symbol values selected from a first set of symbol values, wherein each of the symbol values in the first set of symbol values map to a first set of characters including at least one shift character;
parsing the data string to remove any symbol values corresponding to the shift characters and a defined number of subsequent symbol values from the data string, the shift character and defined number of subsequent symbol values comprising a set of parsed symbol values;
converting each set of parsed symbol values into a character code, the character code selected from a first set of character codes;
converting each of the symbol values in the parsed data string into a character code, the character code selected from the first set of character codes; and
assembling the character codes into a data string.

38. The method of claim 37, further comprising the steps of:

imaging a symbol, the symbol comprising a plurality of symbol characters;

converting the imaged symbol into a data string comprising the plurality of symbol values, each of the symbol values corresponding to a respective one of the symbol characters; and outputting the symbol values as the data string.

39. The method of claim 37, wherein the step of converting the single byte symbols into double byte character codes comprises the steps of:

converting each of the single byte symbol values into a single byte character code; and converting each of the single byte character codes into the double byte character code.

40. The method of claim 37, further comprising the steps of:

imaging a symbol to produce a signal representative of each of a plurality of symbol characters comprising the symbol;

analyzing the signal to identify the symbol characters; and converting each of the symbol characters into a corresponding symbol value.

41. An article of manufacture having computer readable program embodied therein for causing a data string to be converted into an optical code, the computer readable program in said article of manufacture comprising the steps of:

receiving the data string comprising a plurality of double byte character codes corresponding to data characters from a double byte character set, a number of the data characters from the double byte character set also belonging to a single byte character set, the optical symbol comprising a number of single byte symbol elements and double byte symbol elements;

parsing the data string to separate the double byte character codes of data characters in the single byte character set from the data string converting each of the double byte character codes in the parsed data string into a combination of symbol values;

converting each of the double byte character codes parsed from the data string into a respective symbol value; and outputting the symbol values to a printer for printing the optical symbol.

42. An article of manufacture having computer readable program embodied therein for causing a string of symbol values to be converted into a string of character codes, the computer readable program in said article of manufacture comprising the steps of:

receiving the string of symbol values selected from a set of symbol values, wherein the set of symbol values map to a set of characters comprising a set of double byte characters and a subset of single byte characters;

parsing the string to separate the symbol values corresponding to the single byte data characters from the symbol values corresponding to the double byte data characters;

converting each pair of the symbol values corresponding to a double byte data character into one character code from a first set of character codes, and converting each of the symbol values corresponding to a single byte data character into one character code from the first set of character codes; and assembling the character codes into the string of character codes.

43. A method converting a plurality of two byte character codes into a set of symbol characters, the method comprising the steps of:

receiving the plurality of two byte character codes, each character code representing a data character chosen from a two byte character set;

identifying as single byte character codes any of the character codes in the plurality of character codes which represents a data character from a one byte character set, the data characters in the one byte character set being a subset of the data characters in the two byte character set;

identifying as double byte character codes all of the character codes not identified as single byte character codes in the plurality of character codes;

converting each of the character codes identified as single byte character codes into a respective symbol character; and converting each of the character codes identified as two byte character codes into a combination of respective symbol characters.

44. A method converting a plurality of symbol values into a set of character codes, the method comprising the steps of:

receiving the plurality of symbol values, each symbol value representing a symbol character;

identifying as double byte symbol values each combination of symbol values in the plurality of symbol values which represents a single data character;

identifying as single byte symbol values any of the symbol values in the plurality of symbol values not identified as double byte symbol values;

converting each of the symbol values identified as single byte symbol values into a respective double byte character code; and converting each combination of symbol values identified as two byte character codes into a respective double byte character code.

45. The method of claim 44 wherein the step of converting each of the symbol values identified as single byte symbol values into a respective double byte character code includes the steps of:

searching a table of double byte character codes to find the respective double byte character code.

46. The method of claim 44 wherein the step of converting each of the symbol values identified as single byte symbol values into a respective double byte character code includes the steps of:

searching a table of single byte character codes to find a respective single byte character code; and appending a fixed single byte value to the respective single byte character code to define the respective double byte character code.

47. The method of claim 44 wherein the step of converting each of the symbol values identified as single byte symbol values into a respective double byte character code includes the steps of:

calculating the respective double byte character code from a defined algorithm having the symbol value as a parameter.

* * * * *